United States Patent [19]

Higgins

[11] Patent Number: 5,276,705
[45] Date of Patent: Jan. 4, 1994

[54] CCD DEMODULATOR/CORRELATOR

[75] Inventor: Robert P. Higgins, Seattle, Wash.

[73] Assignee: The Boeing Company, Seattle, Wash.

[21] Appl. No.: 1,067

[22] Filed: Jan. 6, 1993

[51] Int. Cl.$^5$ .............................. H04K 1/00; H04L 9/00
[52] U.S. Cl. ........................................................ 375/1
[58] Field of Search ............................................. 375/1

[56] References Cited

U.S. PATENT DOCUMENTS

4,156,858  5/1979  Weckler et al. .................... 333/165
4,964,138 10/1990  Nease et al. ........................ 375/1

Primary Examiner—David C. Cain
Attorney, Agent, or Firm—Christensen, O'Connor, Johnson & Kindness

[57] ABSTRACT

A charge-coupled device (CCD) used as a demodulator and a correlator in the receiver of a spread spectrum radio system. The device implements both functions in the charge domain, thereby avoiding unnecessary conversions between voltage and charge that would normally be required if the functions were separately implemented. In its preferred form, the demodulator and correlator include an in-phase filter (170), a quadrature filter (172), delay circuits (174, 176), decimation circuits (181–184), correlators (191–194), and signal combiners (200, 202). The delay circuits are used in the preferred embodiment to compensate a time shift between the in-phase and quadrature channels that result from the minimum shift keying modulation used, but would not necessarily be required for other types of modulation. The decimation circuits match the data rate of the in-phase and quadrature filters to the data rate used by the correlators, which is determined as a function of chip rate used to spread the data. Each of the in-phase and quadrature channels are implemented in a CCD, which includes a "pipe organ" filter structure to implement the respective filters that process the analog input signal for each channel. Storage sites are configured as delay lines in the device.

17 Claims, 7 Drawing Sheets

CCD DEMODULATOR/CORRELATOR

FIELD OF THE INVENTION

The present invention generally relates to spread spectrum communication systems and, in particular, to a demodulator/correlator for use in a direct sequence spread spectrum receiver.

BACKGROUND OF THE INVENTION

In a spread spectrum system, a transmitted signal is spread over a frequency band that is much wider than the bandwidth of the information being transmitted. One technique commonly used in spread spectrum systems is direct sequence (DS) modulation. In DS modulation, each bit of an information-bearing signal is modulated by a higher frequency, binary, pseudorandom code signal. This DS modulation step may simply comprise producing the code signal itself when the information bit is one, and inverting the code signal when the information bit is zero. Each bit of the code signal, and each bit of the DS modulated signal obtained by modulating the information-bearing signal with the code signal, is referred to as a "chip."

Once the DS modulated signal has been produced, it is applied to modulate an intermediate frequency (IF) carrier using any one of several phase or frequency shift keying techniques, e.g., quadrature phase shift keying (QPSK), minimum shift keying (MSK), and bi-phase phase shift keying (BPSK). The IF modulated signal is then up-converted to RF and transmitted. At the receiver, the received signal is first down-converted to an IF signal, and the IF signal is then input to a demodulator that recovers the DS modulated signal. The DS modulated signal is input to a correlator, which "despreads" the DS modulated signal using the same pseudorandom code signal that was used in the transmitter during the DS modulation step. This correlation step permits extraction of the transmitted information-bearing signal, even in the presence of noise or jamming.

Since most DS spread spectrum signals have a very low input signal-to-noise ratio (SNR), the demodulation and correlation are carried out non-coherently. A typical approach is to provide quadrature demodulation of the IF signal, followed by quadrature correlation. In the prior art, a quadrature demodulator is typically followed by a separate and fully independent quadrature correlator circuit.

There are several well known techniques for implementing quadrature demodulators. A common analog quadrature demodulator is configured using mixers and one or more low pass filters. Another approach (usually implemented digitally), is to perform a Hilbert transform to obtain the quadrature component of the signal being demodulated. The advantage of using a Hilbert transform to perform the quadrature demodulator function is that better amplitude and phase match between two channels can be achieved without requiring adjustment of the circuit.

The Hilbert transform can easily be implemented in a finite impulse response (FIR) filter structure. FIR filters have previously been provided using charge-coupled devices (CCDs), for example, as described in U.S. Pat. No. 4,156,858. In this reference, an input signal to the CCD is either a voltage or current that is converted to charge for internal storage; the filter function is implemented by converting the charge information to a voltage or current for output from the device.

Correlators have also been implemented in CCDs. As in the CCD filter discussed above, the input signal to the correlator is a voltage or current that is converted to charge for storage in the device.

In a conventional DS receiver in which both the demodulator and correlator are implemented in separate CCDs, it has in the past been necessary to convert the charge at the output of the CCD demodulator to a voltage, and then reconvert this voltage back to a packet of charge for processing by the CCD correlator. These conversion steps introduce errors and unnecessary complexities into the system. Accordingly, it would be desirable to implement the demodulator and correlator in an integral device that avoids unnecessary conversions between voltage and charge, thereby minimizing distortion and losses.

SUMMARY OF THE INVENTION

The present invention is a demodulator/correlator that is used in a receiver for a DS modulated spread spectrum system. In accordance with the present invention, a demodulator and a correlator are implemented as a single CCD circuit, eliminating the need to convert between the voltage and charge domain to couple the demodulator output to the correlator input.

In one preferred embodiment, the demodulator/correlator includes a demodulator that comprises a CCD filter. The filter comprises a plurality of filter charge storage sites, means for causing charge packets to propagate along the filter charge storage sites, and at least one filter input site at which a received signal is sampled and converted into charge packets. The filter also includes an output site at which the filter produces a demodulated signal in the form of a sequence of charge packets. The correlator comprises a CCD delay line and a matching circuit. This CCD delay line comprises a sequence of correlator charge storage sites, including a correlator input site and means for coupling the demodulated signal to the input site. The matching circuit comprises means for storing a code signal, and means for combining charge packets stored in the correlator charge storage sites in accordance with the code signal, to produce an output signal indicating the degree of correlation between the demodulated signal and the code signal.

Preferably, the CCD filter comprises a plurality of channels, each channel having a sequence of filter charge storage sites including a filter input site, the channels having a common channel output site. The CCD filter also includes means for introducing a charge packet into each filter input site, the charge packet having a charge magnitude proportional to the received signal and to a fixed filter coefficient. A width of each channel is proportional to the magnitude of the associated filter coefficient.

A method for demodulating and correlating a received signal in a DS modulated spread spectrum system receiver is a further aspect of the present invention. The method includes steps that are generally consistent with the functions of the elements comprising the demodulator/correlator discussed above.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1A:
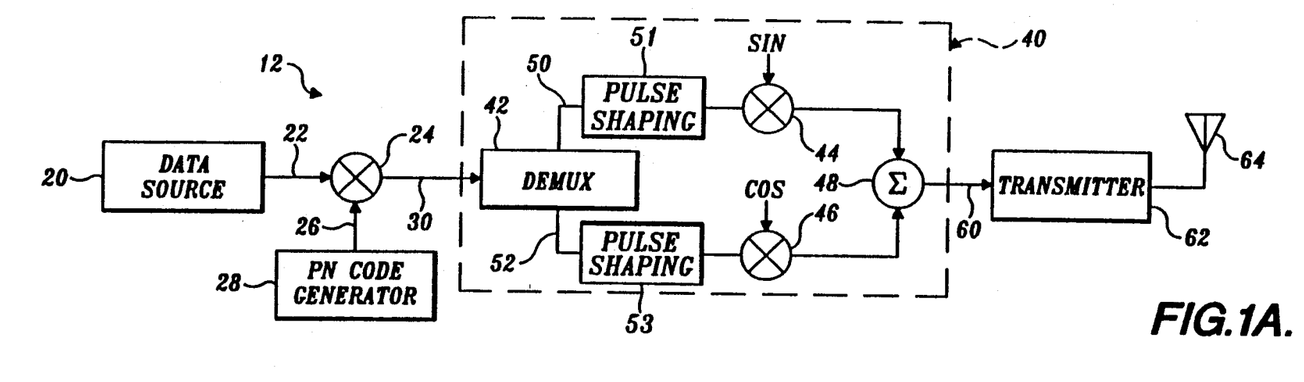
FIG. 1A is a block diagram of a transmitter for a spread spectrum, DS communication system.
Figure 1B:
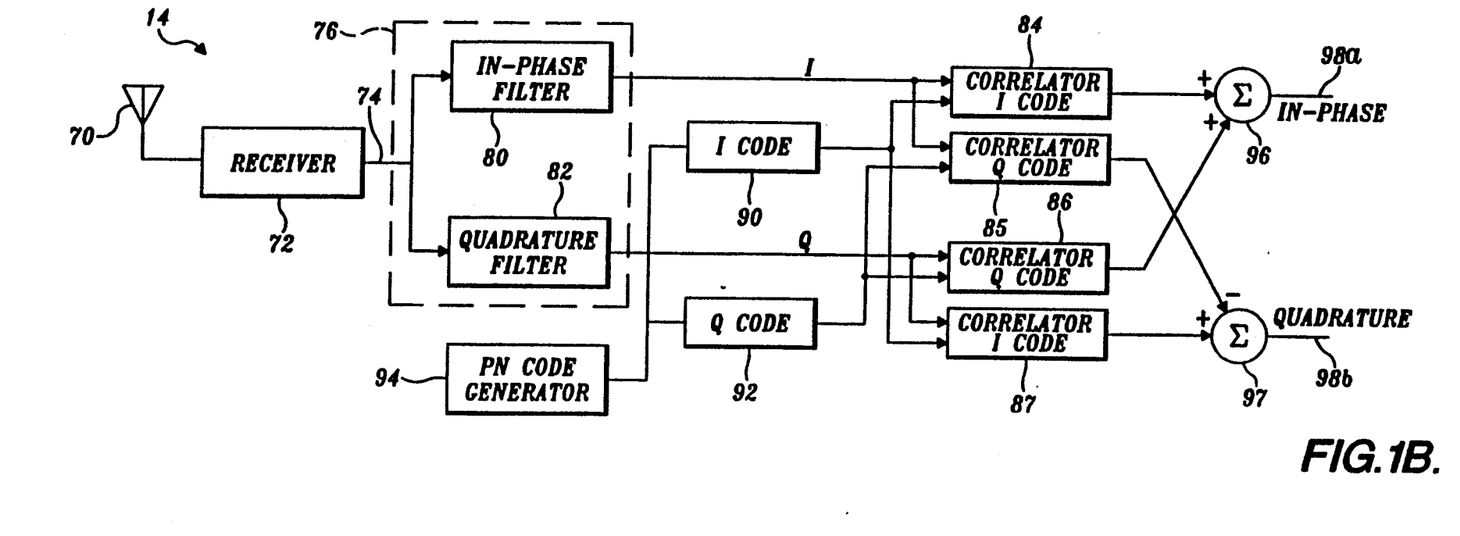
FIG. 1B is a partial block diagram of a receiver for a spread spectrum, DS communication system in which the present invention is used.

FIGS. 1A and 1B illustrate a spread spectrum, DS communication system comprising a transmitter 12 and a receiver 14. Although the present invention only relates to a portion of receiver 14, the utility of this invention is better appreciated if the DS communication system in which it is used is fully understood. Accordingly, the DS communication system is discussed in some detail as follows.

Transmitter 12 comprises a data source 20 that produces an information-bearing signal 22 to be transmitted. The information-bearing signal is combined in a multiplier 24 with a code signal 26 produced by pseudorandom number (PN) code generator 28. For a binary information bearing signal, multiplier 24 preferably comprises an exclusive-OR gate—not separately shown. Code signal 26 is a binary sequence having a data rate much higher than that of the information-bearing signal 22. Each bit of the code signal is commonly referred to as a "chip." Although the sequence of chips in the code signal has a random appearance, it is a deterministic signal that is identically reproduced in the receiver, as described below.

A number of different types of modulation schemes can be used for a DS communication system. As appropriate for the MSK modulation used in the exemplary system of FIGS. 1A and 1B, a DS modulated signal 30 produced by multiplier 24 is input to a quadrature phase shift modulator 40. The quadrature phase shift modulator comprises a demultiplexer 42, mixers 44 and 46, and a summer 48. Demultiplexer 42 separates the chips of DS modulated signal 30 into even and odd sequences that are conveyed on lines 50 and 52, respectively. The even sequence on line 50 is modulated by a sinusoidal signal at an IF, while the odd chip sequence on line 52 is modulated by a cosine signal at the same IF. The modulated signals are then combined in summer 48 to produce an IF signal 60. The IF signal is up-converted to a higher radio frequency (RF) by a transmitter (second stage section) 62 and propagated from an antenna 64.

At receiver 14 (FIG. 1B), the RF signal received at an antenna 70 is down-converted by a receiver (front end) 72, and the resulting IF signal 74 is input to a demodulator 76 that comprises an in-phase filter 80 and a quadrature filter 82. In the illustrated embodiment, quadrature filter 82 performs a Hilbert transform and provides pulse shape matching, while in-phase filter 80 matches to the pulse shape and provides a delay equivalent to that of the Hilbert transform. These filters can be designed to provide any arbitrary pulse shape, and in the present preferred embodiment, the filters match to an MSK signal that comprises a half-cosine pulse shape. The in-phase and quadrature filters produce in-phase (I) and quadrature (Q) signals that are input to four correlators 84, 85, 86, and 87. These correlators implement a full complex correlation operation, which is required for quadrature modulations such as MSK. Correlator 84 correlates the in-phase (I) signal with an in-phase code (I code) 90 comprising every other chip in a code signal from a PN code generator 94. PN code generator 94 produces the same pseudorandom sequence as PN code generator 28 in transmitter 12. Correlator 86 operates in a similar manner and correlates the quadrature (Q) signal with a Q code 92 that comprises the remaining chips of the code signal. The outputs of correlators 84 and 86 are added together with the appropriate signs in a summer 96, as shown in FIG. 1B, producing an in-phase term of the correlation 98a. Analogously, correlator 85 correlates the in-phase signal with the quadrature code, and correlator 87 correlates the quadrature signal with the in-phase code. The outputs of correlator are then combined with the appropriate sign by a summer 97 to produce a quadrature term of the correlation 98b. Further processing is carried out to reproduce the information bearing signal, making use of the analytic (in-phase and quadrature terms) representation of the correlation. Details of this processing, which are highly dependent upon the data modulation format used, are not presented herein, since such details are beyond the scope of the present invention.

As noted above in the Background of the Invention, a demodulator and a correlator may be implemented using separate CCD technology. A prior art technique for the CCD implementation of either of filters 80 and 82 is the split electrode filter shown in FIG. 2. A filter of this type is described in U.S. Pat. No. 4,156,858. The filter comprises a substrate in which a channel 100 is formed. Overlying the channel is a plurality of transfer gates 102 connected to a common signal source 104, and a plurality of split electrodes 106. Each split electrode comprises an upper portion connected to an upper signal line 108, and a lower portion connected to a lower signal line 110. Signal lines 108 and 110 are connected to the positive and negative inputs of a differential amplifier 112, respectively.

Figure 2:
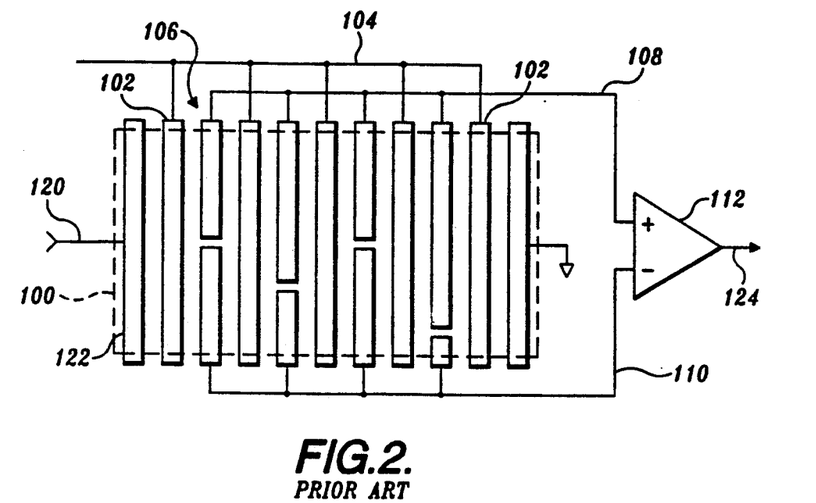
FIG. 2 is a diagram of a prior art CCD filter.

An input signal on a line 120 is connected to an input electrode 122. The voltage of the input signal is converted into a packet of charge in channel 100 that is clocked from charge storage cell to charge storage cell, down the channel in a manner similar to an analog delay line. The positions of the breaks in split electrodes 106 provide the fixed filter coefficients that characterize a particular implementation of such a filter. The output of the CCD filter is a voltage signal on a line 124.

Figure 3:
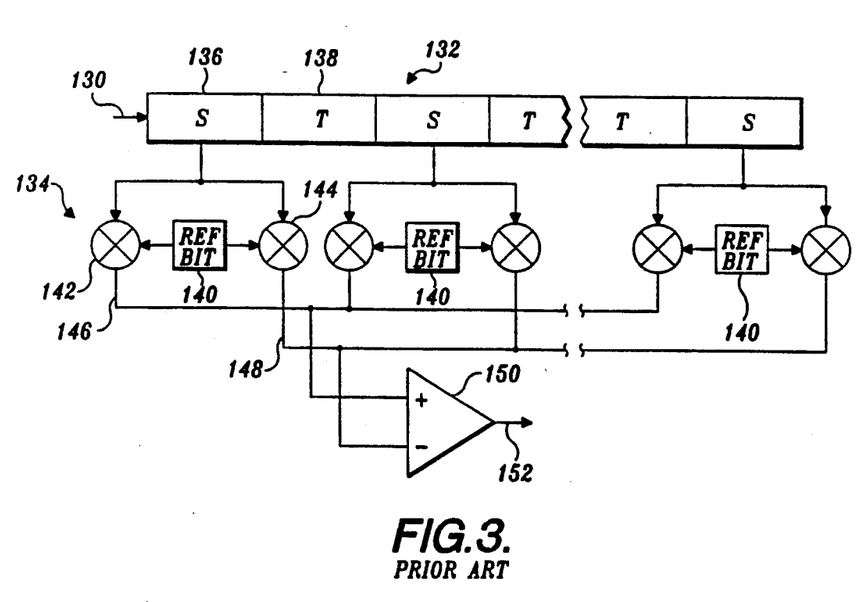
FIG. 3 is a diagram of a prior art CCD correlator.

FIG. 3 represents a prior art CCD implementation of a correlator. The correlator comprises a tapped delay line 132 and a matching circuit 134. The tapped delay line comprises storage sections (S) 136 and transfer sections (T) 138. Matching circuit 134 comprises a plurality of reference bit registers 140, one for each storage section 136. The incoming signal to the correlator on a line 130 is input to tapped delay line 132, while the code signal to which the incoming signal will be compared is stored in reference bit registers 140.

The level of charge in each storage cell is non destructively sensed with a floating gate electrode (not separately shown), which is connected to the input of a high input impedance buffer amplifier (also not separately shown). The output of the buffer amplifier is a voltage that represents the amount of charge stored in one of the cells. This voltage signal is connected to both a positive gate 142 and a negative gate 144, and the sense of these gates ("on" or "off") is controlled by an associated reference bit register 140. Depending on the sign of a reference bit provided by the reference bit register, the voltage signal from the buffer amplifier is coupled to a positive bus 146 via the positive gate, or to a negative bus 148 via the negative gate. Positive and negative busses 146 and 148 are in turn connected to the positive and negative inputs of a differential amplifier 150 that produces an output signal 152, which is proportional to the difference between its inputs. In general, a significant output will only be produced when the chip sequence stored in tapped delay line 132 matches the chip pattern stored in reference bit registers 140, or its inverse.

A significant drawback of the CCD implementations illustrated in FIGS. 2 and 3 is that output 124 of the CCD filter is a voltage domain signal that must be converted back to the charge domain for input into tapped delay line 132. This conversion is a source of inaccuracy, and further complicates the design of the circuit. To overcome this shortcoming, the present invention provides a combination CCD demodulator/correlator in which the charge packets (in the charge domain) produced by the demodulator are input directly to the correlator, without conversion to the voltage domain. The resulting integral demodulator/correlator is substantially more efficient than the separate demodulator and correlator of the prior art.

Figure 4:
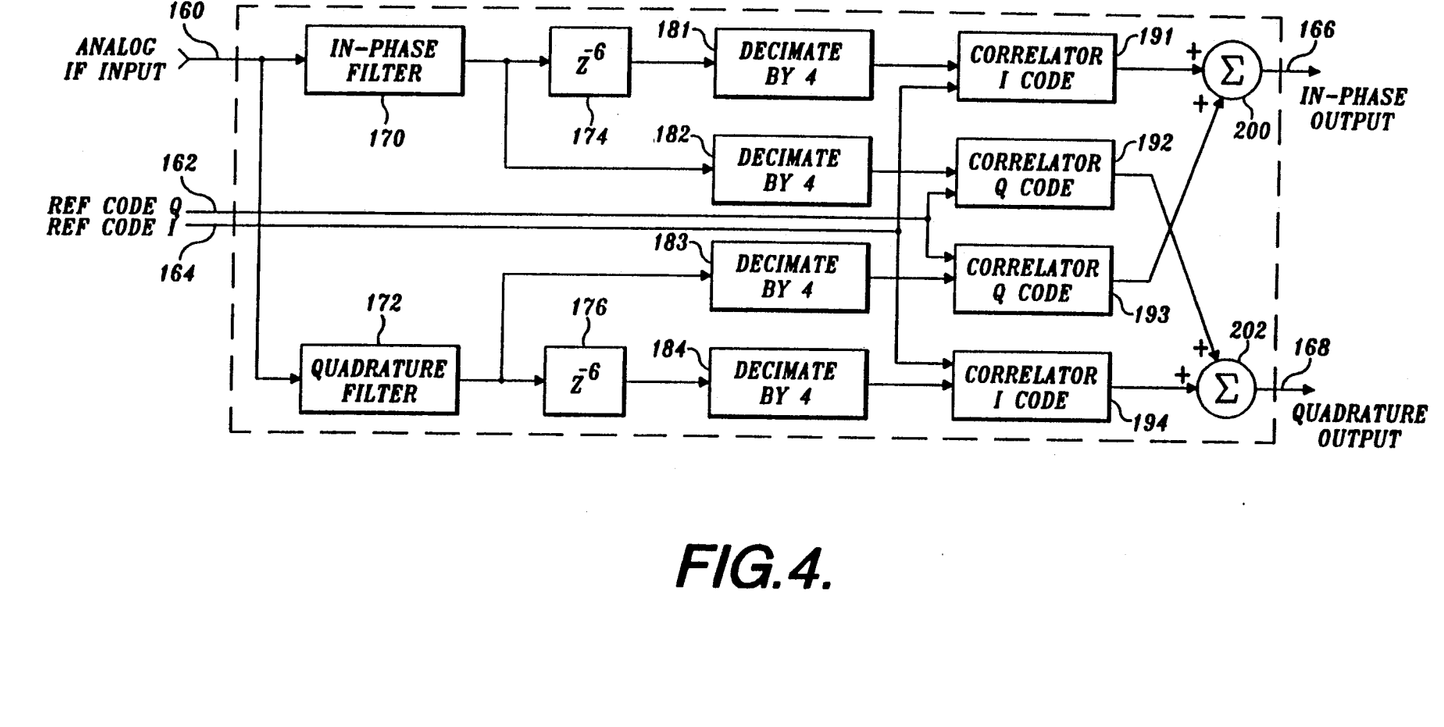
FIG. 4 is a block diagram of a demodulator/correlator that can be implemented using the present invention.

FIG. 4 presents a functional block diagram of the demodulator/correlator in accordance with the present invention. The circuit in FIG. 4 receives an analog, IF input signal on a line 160, and I and Q code signals on lines 164 and 162, respectively. The circuit produces in-phase and quadrature output signals on lines 166 and 168, respectively. The demodulator/correlator comprises an in-phase filter 170, a quadrature filter 172, delay circuits 174 and 176, decimation circuits 181-184, correlators 191-194, and signal combiners 200 and 202. Correlators 191 and 194 use the in-phase (I) reference code signal provided on line 164, while correlators 192 and 193 utilize the quadrature (Q) reference code signal provided on line 162. It is to be understood that the block diagram in FIG. 4 is but one example of an architecture for effecting demodulation and correlation according to the present invention, in a spread spectrum receiver, and that many other architectures and configurations can also be implemented using the present invention.

For this example, which illustrates the use of the preferred embodiment of the present invention, it will be assumed that the communication system uses an MSK (minimum shift key) technique for IF modulation. The IF signal on line 160 will therefore comprise overlapping in-phase and quadrature components, each having a half cosine shape and a duration twice as long as the chip interval. For different types of modulation, a correspondingly different type of IF signal would be implemented.

Accordingly, for the MSK modulation, the purpose of delay circuits 174 and 176 is to compensate for the time shift between the in-phase and quadrature channels that is introduced in the quadrature modulation process carried out at the transmitter. For other types of modulation, the delay circuits would not be needed. Decimation circuits 181-184 match the data rate of the in-phase and quadrature filters to the data rate used by the correlators. The data rate used by correlators 191-194 is determined as a function of the chip rate, i.e., the frequency of code signal 26 that is used at the transmitter to modulate or spread the data. Although correlators must be operated at a rate of at least two samples per chip to satisfy the Nyquist criteria, the present preferred embodiment uses three samples per chip, to minimize correlation losses. As a result, the sample rate into each correlator, $f_c$, is given by $f_c = 3(f_{pn})/2$, where $f_{pn}$ is the DS chip rate of the code signal.

To produce a complex baseband signal from the passband Hilbert transformed signal by decimation, the IF signal frequency is constrained to be an integer multiple of the sample rate used by the correlators. The IF frequency, $f_{IF}$, is therefore defined by: $f_{IF} = N(3)(f_{pn})/2$, where N is an odd integer. The sample rate of the in-phase and quadrature filters needs to be an integer multiple of the IF frequency, so that the filter outputs can be decimated by that integer to create the correlator inputs. In addition, the filter sample frequency must meet the Nyquist criteria. As a result of these constraints, the filter sample frequency, $f_s$, is given by: $f_s = 4*3f_{pn}/2 = 6f_{pn}$. Thus, decimation circuits 181-184 decimate by four, and delay circuits 174 and 176 provide delays of six sample clock cycles, which are equal to one chip interval. The six sample delay inserted between the in-phase and quadrature components of the MSK signal and two of the correlator channels is to accommodate the offset nature of the in-phase and quadrature components of the MSK signal. It is necessary to remove the offset component for proper correlation of the signals, but the offset cannot be removed in the correlators because of the relative frequencies of the MSK waveform and the sample rates of the filters and correlators.

Figure 5:
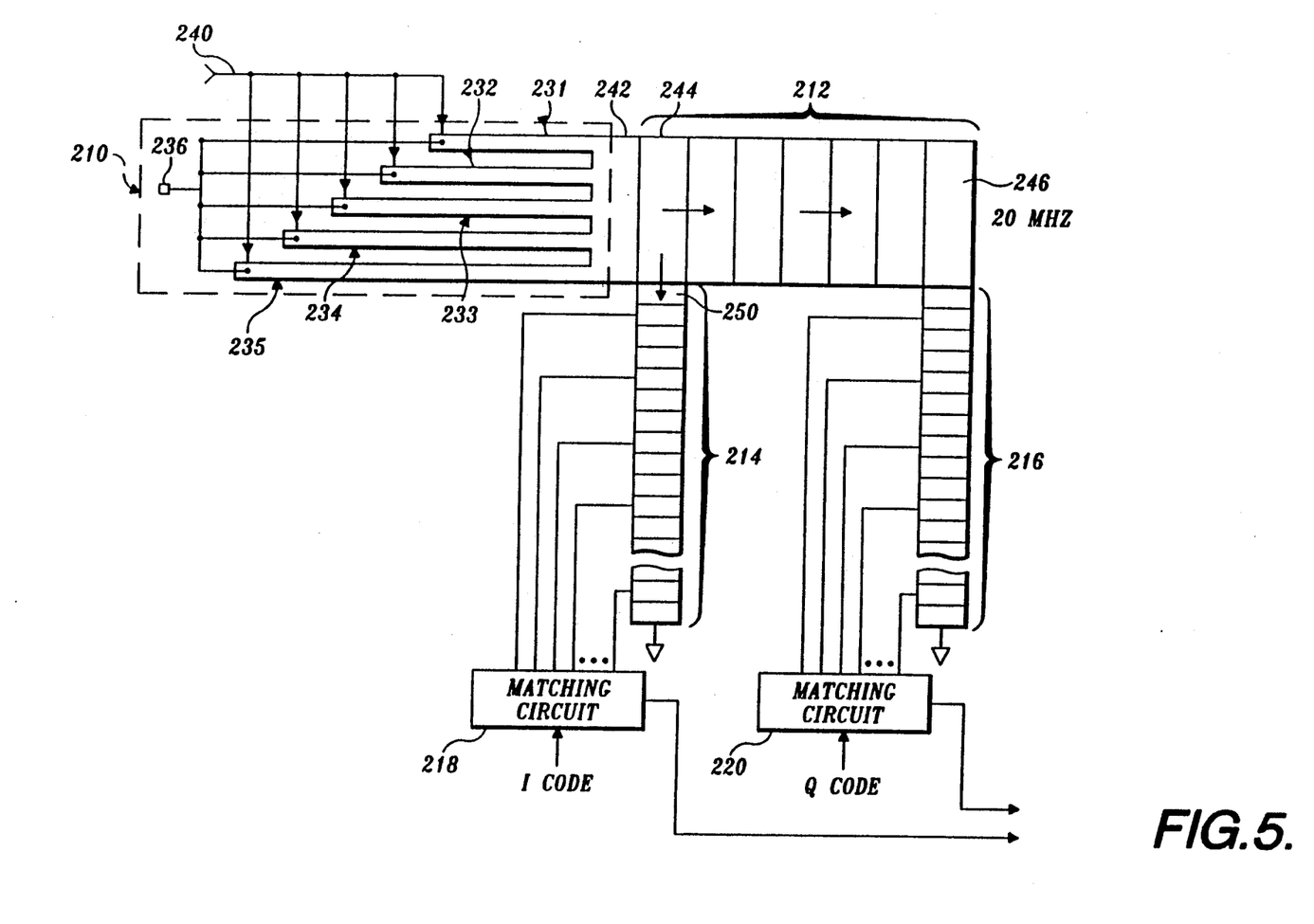
FIG. 5 is a diagram showing the overall operation of the CCD demodulator/correlator of the present invention.

A preferred embodiment of a CCD demodulator/correlator according to the present invention is illustrated in FIG. 5. The illustrated CCD circuit comprises a filter 210, a delay circuit 212, delay lines 214 and 216, and matching circuits 218 and 220. The illustrated circuit corresponds to one-half of the complete circuit shown in FIG. 4. Thus, for example, in-phase filter 170 corresponds to filter 210, delay circuit 174 corresponds to delay circuit 212, and correlators 191 and 192 correspond to the combination of delay lines 214 and 216 and the respective matching circuits.

Figure 6:
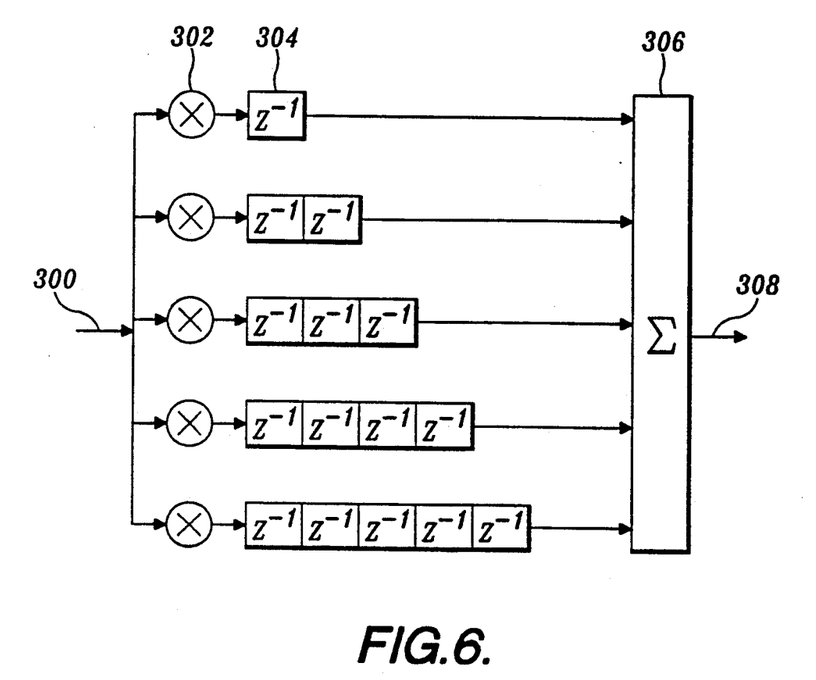
FIG. 6 is a conceptual diagram of a pipe organ filter.

FIGS. 6-9 illustrate a preferred embodiment of filter 210 in greater detail. FIG. 6 presents a generalized conceptual view of the "pipe organ" filter structure upon which the filter of this embodiment is based. In the pipe organ structure, an input signal on a line 300 is input into a series of multipliers 302, each of which multiplies the input signal by a predetermined filter coefficient W. In the illustrated filter, there are five multipliers, and five filter coefficients W0-W4. The output of each multiplier is then input into a delay line 304, each delay line having a different length. For example, the output of the first multiplier (W0) is delayed by one clock cycle, the output of the second multiplier (W1) is delayed by two clock cycles, etc. The delay line outputs are then combined in a summer 306 to produce an output signal 308.

Referring back to FIG. 5, the filter, delay circuit, and delay lines each thus comprise a series of storage sites in a pipe organ configuration, each capable of storing a packet of charge. For simplicity, the transfer gates between successive storage sites have been omitted. Filter section 210 comprises five side-by-side channels 231-235, each comprising a different number of storage sites, although more or less than five could also be used. During each clock cycle, the analog input signal on a line 240 regulates the amount of charge injected from a charge source 236 into each channel. The innermost storage sites of the channels are coupled to a common storage site 242.

The operation of filter 210 is further described below. In general, by forming the channel widths and the electrode patterns in accordance with the desired filter coefficients, the appropriate filtering of input signal 240 is accomplished, with the quantity of charge delivered to storage site 242 representing the filtered signal. The amount of charge stored is proportional to the voltage of the input signal and the area of the storage cell; the area of the storage cell is proportional to the filter coefficient. The filtered signal then travels along delay circuit 212, from a storage site 244 to a storage site 246. Storage site 244 is coupled to delay line 214, while storage site 246 is coupled to delay line 216. For the specific implementation illustrated, it will be apparent that by providing five sites between storage sites 244 and 246, a delay of six clock cycles is accomplished.

A packet of charge that enters the first storage site 250 of delay line 214 thereafter travels down the delay line, one storage site per clock cycle. The clock rate of delay line 214 is thus one-fourth that of filter 210 and delay circuit 212. Every third storage site of delay line 214 is tapped or coupled to one of the inputs of matching circuit 218. On every fourth clock cycle, charge stored in storage site 244 is transferred to storage site 250 instead of through delay circuit 212. Delay line 216 operates in a similar manner with respect to matching circuit 220. Thus, with the illustrated arrangement, the demodulation and correlation functions are performed without leaving the charge domain and without introducing the errors associated with conversion of the charge packet into a voltage signal, and then back to a charge packet.

Figure 7:
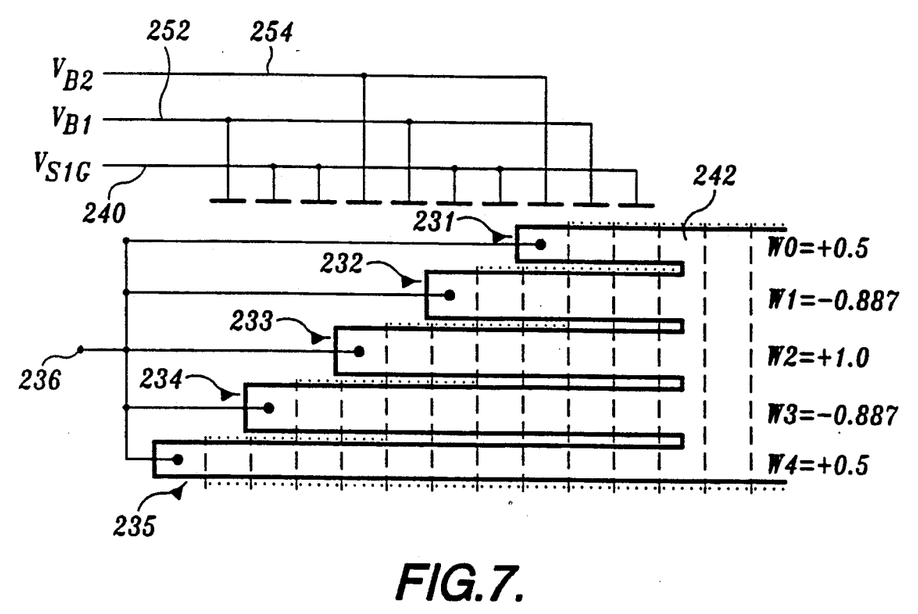
FIG. 7 is a diagram of a preferred embodiment of the CCD filter portion of the demodulator/correlator of the present invention.
Figure 8A:
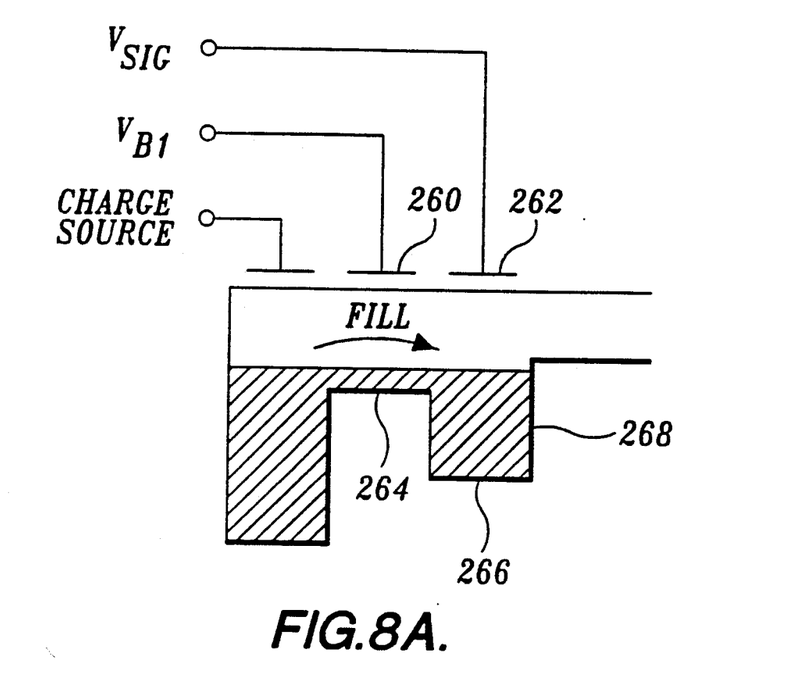
FIGS. 8A and 8B illustrate the technique for creating a packet of charge for a positive filter coefficient.
Figure 8B:
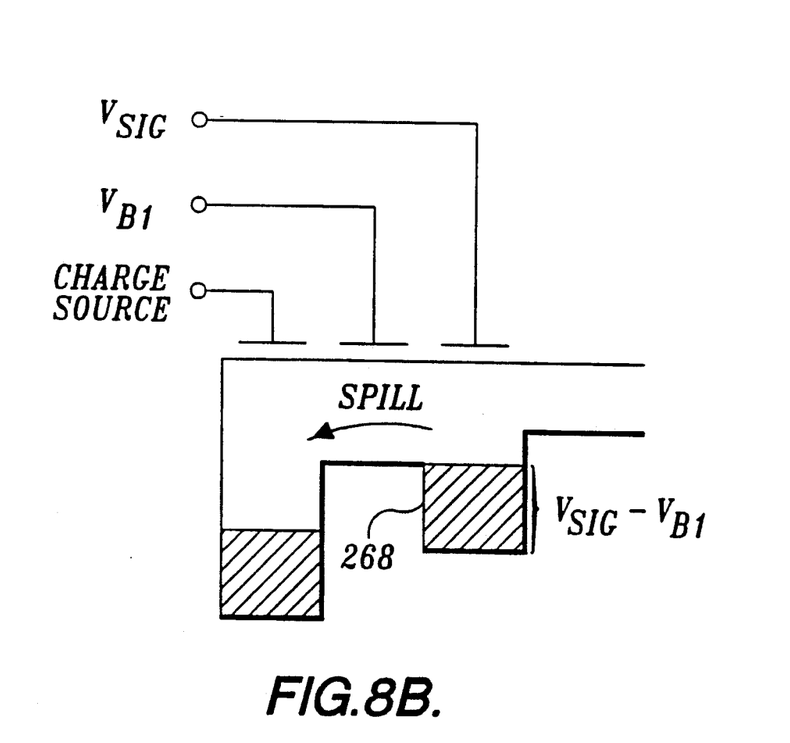
Figure 9A:
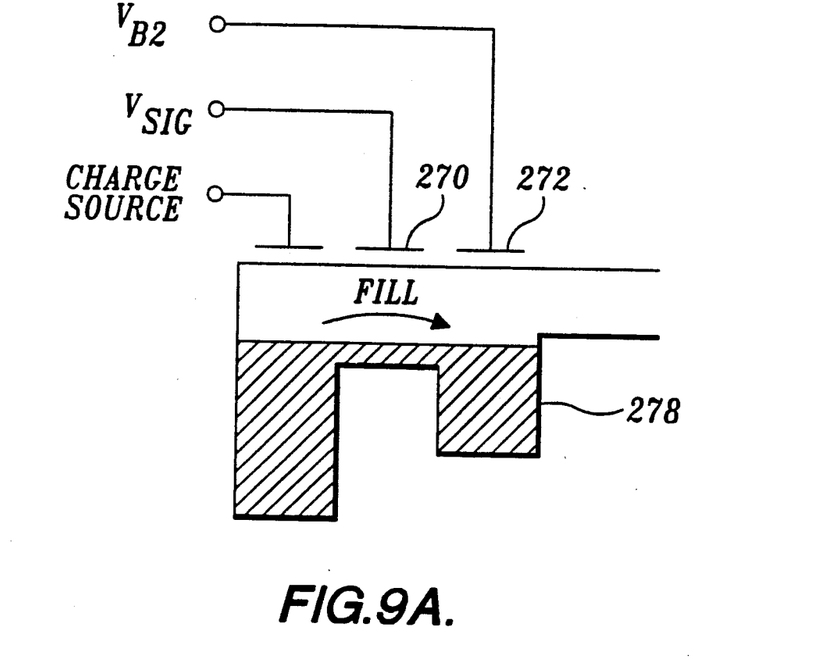
FIGS. 9A and 9B illustrate the technique for creating a packet of charge for a negative filter coefficient.
Figure 9B:
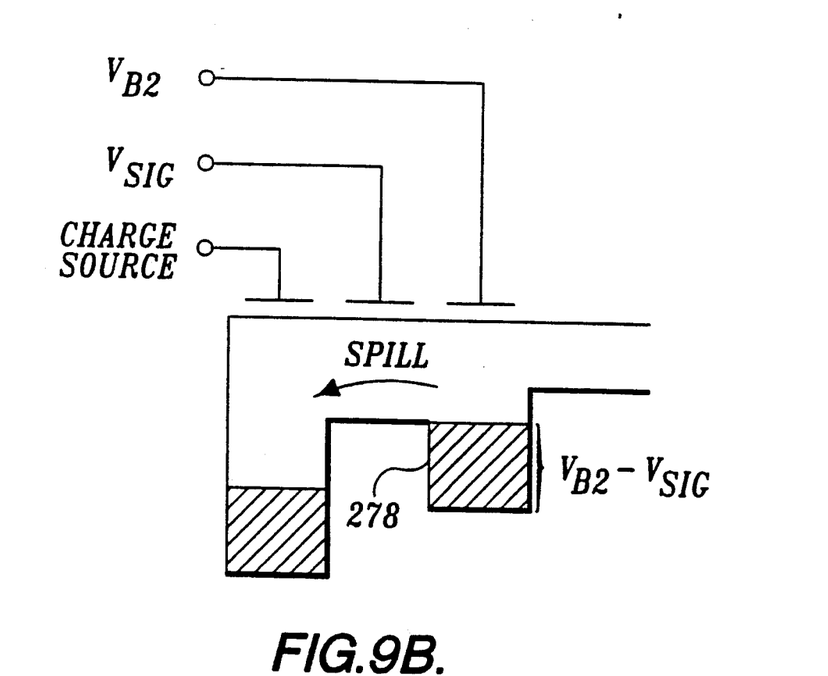

FIGS. 7-9 illustrate details of a preferred pipe organ embodiment. As described above in connection with FIG. 5, filter 210 comprises five channels 231-235 that ultimately connect to a common storage site 242. The different lengths of the channels correspond to the different time delays in delay lines 304 of the conceptual model shown in FIG. 6. The input signal $V_{SIG}$ is provided on line 240, and a pair of bias signals $V_{B1}$ and $V_{B2}$ are provided on lines 252 and 254, respectively. In general, the input signal $V_{SIG}$ causes a quantity of charge to be injected into the leftmost storage site of each channel. In accordance with FIG. 6, this quantity of charge is equal to the magnitude of the input signal, multiplied by one of the filter coefficients W0-W4.

The filter shown in FIG. 7 is implemented for the five filter coefficients shown along the right-hand edge of the figure. The width of each channel is proportional to the magnitude (i.e., the absolute value) of the filter coefficient, as further described below. The sign of the filter coefficient is taken into account as shown in FIGS. 8 and 9. FIGS. 8A and 8B illustrate the construction of the leftmost end of a channel for which the coefficient is positive, e.g., channels 231, 233, and 235 of FIG. 7. For such channels, a bias electrode 260 is positioned adjacent to the charge source, followed by a signal electrode 262. Bias electrode 260 is held at a value $V_{B1}$, which is the minimum value of the signal that will be applied at signal electrode 262. The signal $V_{SIG}$ is applied to signal electrode 262, creating the potential profile shown by levels 264 and 266 in FIG. 8A. A technique known as "fill and spill" is then used, wherein charge fills this potential well when the charge source is "on," and excess charge spills from the potential well when the charge source is "off." The quantity of charge in well 268 is proportional to $V_{SIG}-V_{B1}$, i.e., the quantity of charge is directly proportional to the signal voltage.

For channels having negative filter coefficients, such as channels 232 and 234, the arrangement shown in FIGS. 9A and 9B is used. In this case, a signal electrode 270 is connected to the signal source $V_{SIG}$ and is positioned directly adjacent to the charge source. A bias electrode 272 is held at a second bias voltage $V_{B2}$. In this case, $V_{B2}$ is set to the maximum value of the signal that will be applied to signal electrode 270, resulting in the creation of a potential well 278. After a fill and spill operation, the amount of charge in well 278 is proportional to $V_{B2}-V_{SIG}$, i.e., the charge is inversely proportional to the signal voltage.

While the preferred embodiment of the invention has been illustrated and described, it will be appreciated that various changes can be made therein without departing from the spirit and scope of the invention. Accordingly, the scope of the invention is not to be limited by the disclosed preferred embodiment, but instead, should be determined entirely by reference to the claims that follow.

The embodiments of the invention in which an exclusive property or privilege is claimed are defined as follows:

1. A CCD demodulator/correlator for use in a direct sequence, spread spectrum receiver for demodulating a received signal to produce a demodulated signal and for correlating the demodulated signal with respect to a code signal to produce an output signal indicating the degree of correlation between the demodulated signal and the code signal, the demodulator/correlator comprising:
   (a) a demodulator comprising:
      (i) at least one filter input site at which a received signal is sampled and converted into charge packets;
      (ii) a CCD filter, the filter comprising a plurality of filter charge storage sites;
      (iii) means for causing the charge packets to propagate along the filter charge storage sites; and
      (iv) an output site at which the filter produces the demodulated signal in the form of a sequence of the charge packets; and
   (b) a correlator comprising:
      (i) a CCD delay line, the CCD delay line comprising a sequence of correlator charge storage sites, including a correlator input site;
      (ii) means for coupling the demodulated signal to the correlator input site;
      (iii) a matching circuit, the matching circuit comprising means for storing a code signal; and (iv) means for combining charge packets stored in the correlator charge storage sites in accordance with the code signal to produce an output signal.

2. The demodulator/correlator of claim 1, wherein the CCD filter comprises a plurality of channels, each channel comprising a sequence of filter charge storage sites, including a filter input site, the channels having a common channel output site, the filter further comprising means for introducing a charge packet into each filter input site, said charge packet having a charge magnitude proportional to the received signal and to a fixed filter coefficient.

3. The demodulator/correlator of claim 2, wherein the width of each channel is proportional to the magnitude of the associated filter coefficient.

4. The demodulator/correlator of claim 1, wherein the CCD filter has a pipe organ architecture.

5. The demodulator/correlator of claim 1, further comprising decimator means for decimating the demodulated signal prior to input to the correlator.

6. The demodulator/correlator of claim 1, wherein the CCD delay line is oriented normal to the filter charge storage sites.

7. The demodulator/correlator of claim 2, wherein the means for introducing a charge packet into each filter input site comprises:
   (a) means for introducing a charge packet having a charge magnitude directly proportional to the received signal when the associated filter coefficient is positive; and
   (b) means for introducing a charge packet having a charge magnitude inversely proportional to the received signal when the filter coefficient is negative.

8. The demodulator/correlator of claim 1, wherein the demodulator/correlator comprises:
   (a) first and second correlators, each correlator comprising:
      (i) a CCD delay line, each CCD delay line comprising a sequence of correlator charge storage sites including:
         (1) a correlator input site; and
         (2) means for coupling the demodulated signal to the input site;
      (ii) a matching circuit, each matching circuit comprising:
         (1) means for storing the code signal;
         (2) means for combining charge packets stored in the correlator charge storage sites in accordance with the code signal to produce an intermediate signal;
   (b) delay means for coupling the demodulated signal to the input sites of the first and second correlators such that there is a relative delay between the demodulated signal coupled to the first correlator and the demodulated signal coupled to the second correlator; and
   (c) means for combining the intermediate signals to produce the output signal.

9. A CCD demodulator/correlator for use in a direct sequence, spread spectrum receiver having a code signal source, said CCD demodulator/correlator comprising:
   (a) demodulation filter means, in receipt of a received signal, for demodulating the received signal, producing a demodulated signal that is in a charge domain form; and
   (b) correlator means, coupled to receive the demodulated signal in the charge domain form, for correlating the demodulated signal with chips provided by a pseudorandom number generator code signal, to recover an intelligence bearing signal.

10. The CCD demodulator/correlator of claim 9, wherein the demodulation filter means comprise a quadrature Hilbert filter that produces an in-phase component and a quadrature component of the received signal.

11. The CCD demodulator/correlator of claim 10, wherein the correlator means comprise a quadrature processor that includes an in-phase portion and a quadrature portion.

12. A method for demodulating and correlating a received signal in a direct sequence, spread spectrum receiver having a pseudorandom number generator that produces a code signal, said method comprising the steps of:
   (a) demodulating a received signal, producing a demodulated signal that is in a charge domain form; and
   (b) directly correlating the demodulated signal in the charge domain form, without any intermediate conversion between a voltage domain and the charge domain form, with a code signal to recover an intelligence bearing signal, said steps of demodulating and correlating being completed entirely in the charge domain to avoid conversion between the charge domain and the voltage domain.

13. A method for demodulating and correlating a received signal to produce a demodulated signal and to correlate the demodulated signal with respect to a code signal, to produce an output signal indicating the degree of correlation between the demodulated signal and the code signal, said method being used in a direct sequence, spread spectrum receiver, comprising the steps of:
   (a) causing a plurality of charge packets to propagate along a plurality of filter charge storage sites, producing a demodulated signal;
   (b) coupling the demodulated signal to a correlator input site;
   (c) storing a code signal; and
   (d) combining charge packets stored in a plurality of correlator charge storage sites in accordance with the code signal to produce an output signal.

14. The method of claim 13, further providing the steps of:
   (a) providing a plurality of channels for demodulating the received signal, the plurality of channels having a common channel output site; and
   (b) introducing a charge packet into each channel, said charge packet having a charge magnitude proportional to the received signal and to an associated fixed filter coefficient for that channel.

15. The method claim 14, wherein a width of each channel is proportional to the magnitude of an associated filter coefficient.

16. The method of claim 13, further comprising the step of decimating the demodulated signal prior to the step of correlating.

17. The method of claim 14, wherein the step of introducing a charge packet into each channel comprises the steps of:
   (a) introducing a charge packet having a charge magnitude directly proportional to the received signal when the associated filter coefficient is positive; and
   (b) introducing a charge packet having a charge magnitude inversely proportional to the received signal when the associated filter coefficient is negative.

* * * * *